Figure 1:
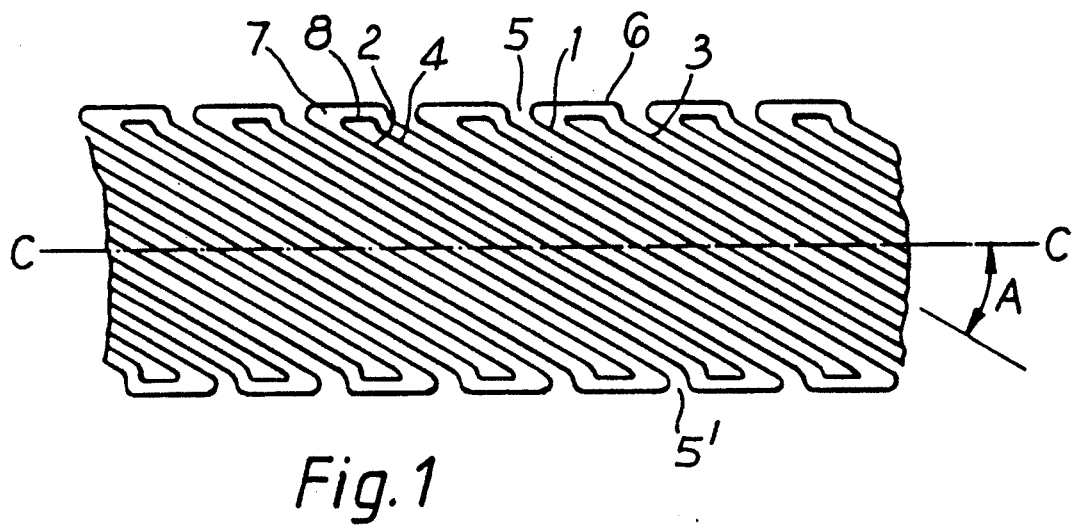

United States Patent [19]
Holroyd et al.

[11] Patent Number: 5,045,376
[45] Date of Patent: Sep. 3, 1991

[54] REINFORCED POLYMERIC ARTICLE

[75] Inventors: Eric Holroyd, Knutsford; David J. B. Perkins, Liverpool, both of England

[73] Assignee: Bridgestone/Firestone, Inc., Akron, Ohio

[21] Appl. No.: 474,131

[22] PCT Filed: Nov. 14, 1988

[86] PCT No.: PCT/GB88/00987
§ 371 Date: May 1, 1990
§ 102(e) Date: May 1, 1990

[87] PCT Pub. No.: WO89/04772
PCT Pub. Date: Jun. 1, 1989

[30] Foreign Application Priority Data

Nov. 13, 1987 [GB] United Kingdom ............... 8726630

[51] Int. Cl.$^5$ .............................................. B32B 5/12
[52] U.S. Cl. ..................................... 428/105; 428/108; 428/192
[58] Field of Search .................... 428/105, 192, 108

[56] References Cited
U.S. PATENT DOCUMENTS 4,161,559 7/1979 Bosse ............................... 428/192
4,325,999 4/1982 Campman et al. ............... 428/192

FOREIGN PATENT DOCUMENTS 0206976 12/1986 European Pat. Off. .

Primary Examiner—James J. Bell
Attorney, Agent, or Firm—Sughrue, Mion, Zinn, Macpeak & Seas

[57] ABSTRACT

A flexible reinforced polymeric article, suitable for use as a breaker fabric in a pneumatic type, comprising an elongate strip of polymeric material having embedded therein a pair of reinforcement elements (1) and (2) disposed in a zig-zag manner across the width of the strip such that two successive transverse portions of one reinforcement element (1) lie between two successive transverse portions of the other element (2) in a manner in which the two elements (1), (2) are free from overlapping cross-over regions. Preferably a part of the length (6), (8) of each element at an edge region (5), (5') of the strip lies parallel with the length (c—c) of the strip.

15 Claims, 4 Drawing Sheets

REINFORCED POLYMERIC ARTICLE

This invention relates to a reinforced polymeric article and in particular, although not exclusively, to tyre tread breaker reinforcement material, generally known as breaker fabric.

The rubber tread of a pneumatic tyre is subjected to repeated deformation due to compression and expansion of the rubber at the point of contact with the road surface. This deformation is the major cause of tread wear and it is now known that the wear can be considerably reduced by introducing an inextensible but flexible band or belt between the tread and the ply carcass, in the area occupied by conventional breakers.

The present invention seeks to provide a reinforced polymeric article, such as a breaker fabric for a pneumatic tyre, which exhibits good resistance to extension at least in one direction, which is flexible and which also facilitates attaining good adhesion to an adjacent component.

In accordance with one of its aspects the present invention provides a flexible reinforced polymeric article comprising at least one layer of flexible polymeric material and at least two flexible reinforcement elements secured to said polymeric material, one flexible element which extends successively to and fro across the polymeric material from a first edge region toward a second edge region and back to the first edge region, a second flexible element which extends successively to and fro across the polymeric material from the second edge region toward the first edge region and back to the second edge region and successive portions of said second flexible element being arranged to lie in spaces between successive portions of the first flexible element extending to and from said first edge region whereby successive portions of each element lie interdigitated with successive portions of the other element in a manner free of cross-over of the elements.

The to and fro disposition of the two reinforcement elements may result, in effect, in a zig-zag lay of the elements.

Each flexible reinforcement element may extend across an elongate layer of flexible polymeric material either at right angles or obliquely, typically at an oblique angle in the range 18 to 90 degrees relative to the length of the layer. Preferably all portions of the reinforcement elements are substantially parallel with one another in a central region between said edge regions.

It is further preferred that each element has at least one intermediate portion which interconnects portions of the element in the central region and extends in a direction substantially parallel with the direction of the length of the layer. That intermediate portion preferably is of a length greater than the spacing of the interconnected central region portions of the element as considered in said direction of the length of the layer.

The successive intermediate portions of an element at a respective edge region and also intermediate portions of that element remote from said edge region may extend parallel with the direction of the layer.

Alternatively only one of the series of successive intermediate portions at said edge region or remote from said edge region may extend substantially parallel with the direction of the length of the layer. In this case it is preferred that it is the series of successive intermediate portions at a respective edge region, rather than the series remote therefrom, which extends substantially parallel with the direction of the length of the layer. Thus in the resulting construction each element provides one outer edge reinforcement lying at a bias angle of the order of 0 degrees and substantially adjacent a remote intermediate portion of the other element where that other element extends across substantially the entire width to said one outer edge.

The flexible reinforced polymeric article preferably comprises two of said layers of flexible polymeric material arranged in superimposed relationship with the flexible reinforcement elements therebetween. The elements may be sandwiched between two layers one of which is wider than the other, edge portions of the wider layer being folded around the edges of the layer of reinforcement elements to contact edges of the narrower layer.

The flexible reinforcement elements may be in the form of monofilaments or groups of filaments which may be twisted together to form yarn or cord type reinforced elements.

Preferably the reinforcement elements are laid with the successive portions at a constant pitch in a central region of the article.

The invention also provides an improved breaker fabric for use in a pneumatic tyre which provides a higher degree of inextensibility in its longitudinal direction together with flexibility and good adhesion to the adjacent components and a tyre incorporating said breaker fabric.

Figure 2:
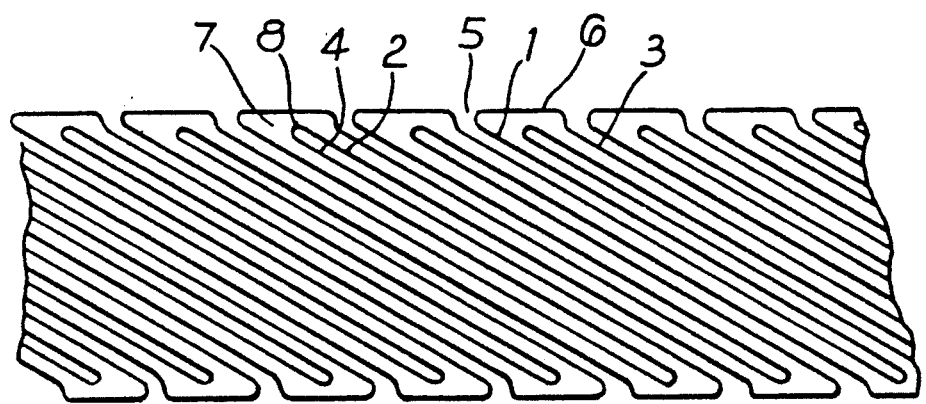
Figure 3:
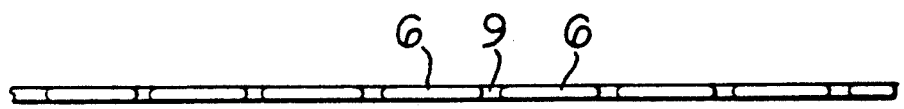
Figure 4:
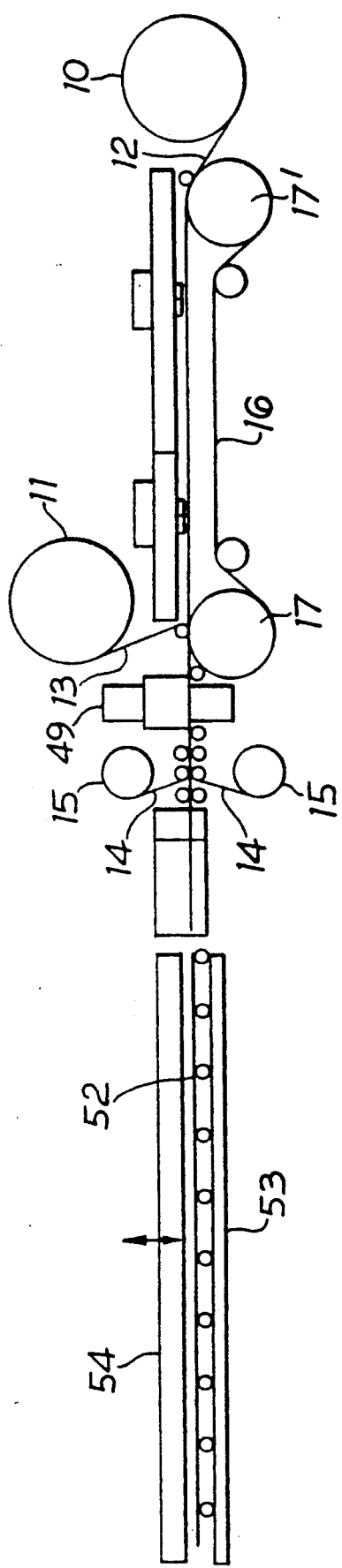
Figure 5:
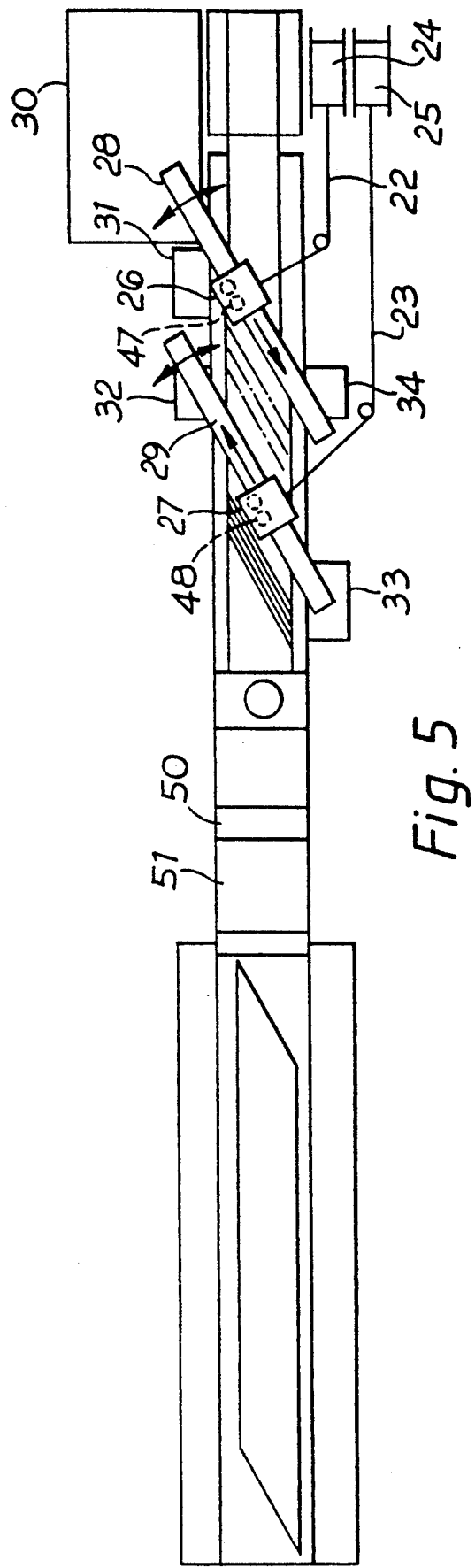

The above and further aspects of the present invention will be apparant from the description of embodiments of the invention given below by way of example with reference to the accompanying diagrammatic drawings, in which:

FIG. 1 is a fragmentary plan view of a preferred breaker fabric reinforcement in accordance with the present invention, FIG. 2 is a fragmentary plan view of another breaker fabric reinforcement in accordance with the present invention, FIG. 3 is a side view of the fabric reinforcement shown in FIGS. 1 and 2 impregnated with rubber, FIG. 4 is a side view of a fabric making apparatus, FIG. 5 is a plan view of the apparatus shown in FIG. 4, and FIGS. 6, 7, 8 and 9 are fragmentary plan views showing various stages of winding the cord reinforcements.

Each of the breaker fabric reinforcements shown in FIGS. 1, 2 and 3 comprises an elongate arrangement of two parallel closely spaced steel wire reinforcement cords 1 and 2 laid at an acute angle of 21 degrees (see angle A in FIG. 1) relative to the longitudinal centre line C—C of the fabric.

The fabric reinforcement is formed by laying cords 1 and 2 in a zig-zag fashion such that when cord 1 reaches the edge 5 it is folded back on itself to run longitudinally, parallel with the centre line of the fabric over an intermediate, edge region marked 6 and then formed to follow the line marked 3.

In the FIG. 1 embodiment when cord 2 reaches position 7 inside the area defined by cord 1 it is folded back on itself over an intermediate edge region marked 8 to run longitudinally over a short distance parallel with the centre line C—C of the fabric and parallel with an edge region 6 and then formed to follow the line marked 4. The cords 1, 2 follow a similar path at the edge 5' the other side of the centre line C—C.

In the FIG. 2 embodiment, the cord 2 follows a path essentially similar to that of cord 2 shown in FIG. 1 except at the position 7. Here it is folded back on itself, following a simple semi-circular path in the region marked 8 without being caused to run longitudinally over a short distance parallel with the centre line C—C.

FIG. 3 shows the cord assembly at the edge of the fabric as being substantially one cord diameter in thickness, with the longitudinal edge region 6 held in position by unvulcanised rubber compound 9 which is impressed into the cord assembly by a consolidating means.

Whilst in the preferred mode of construction the acute angle made between successive cords running obliquely over a central region of the fabric from edge 5 to edge 5' of the fabric and the circumferential centre line C—C is 21 degrees, this angle may be selected within a range of from eighteen to ninety degrees without loss of the desired properties.

The apparatus for manufacturing a breaker fabric incorporating either of the breaker fabric reinforcements shown in FIGS. 1 and 2 is illustrated in FIGS. 4 and 5. It comprises an elastomeric sheet let-off device 10 situated at one end of the apparatus and incorporating a constant tension unit (not shown) for supplying the lower rubber film 12. A similar let-off device 11 is provided for supplying the upper rubber film 13.

Each of the rubber films 12, 13 may be backed by a layer of lining material 14 such as polyvinyl-chloride to act as an adhesion insulating medium whilst in the roll and to support the rubber film during the wire cord laying operation. The lining material 14 is removed from the upper and lower rubber films by two driven liner batching units 15 situated one above the line of the breaker fabric and the other below. These driven units maintain a constant tension in the liners through the utilisation of torque limiters (not shown).

Construction of the reinforced breaker fabric is carried out on a conveyor 16 which preferably consists of two stainless steel endless belts. arranged side-by-side relative to one another and capable of being adjusted to vary their combined overall width. Thus a range of breaker widths may be accommodated. The belts are driven via the drum 17 around which they extend from a second drum 17' by an indexing means (now shown) which is capable of imparting a variable linear motion to the belts to suit the required breaker material specification. It will be seen later in this example that the belts will index alternately 3 pitches of cord, measured along the longitudinal axis C—C of the breaker and then by one pitch of cord.

Figure 7:
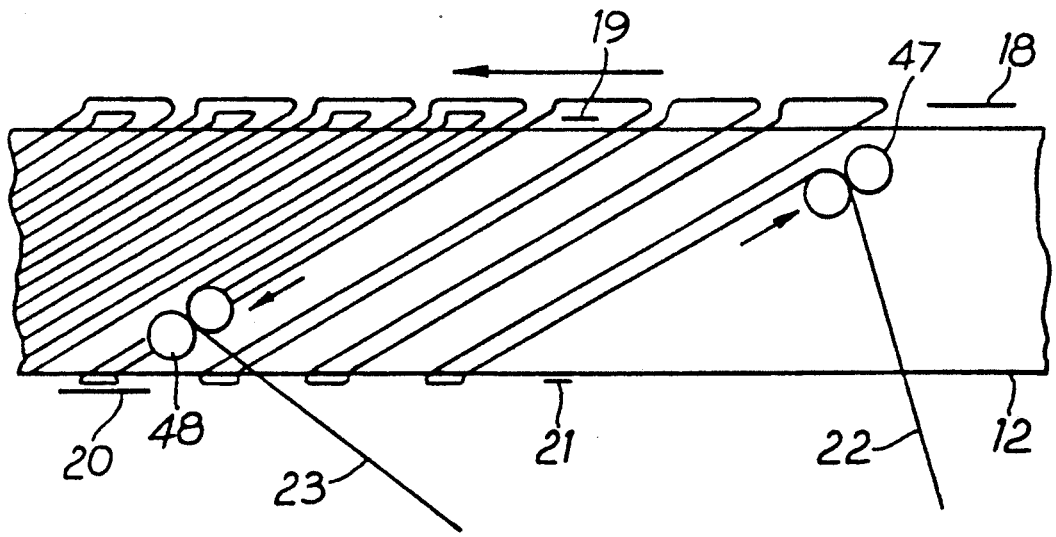
Figure 8:
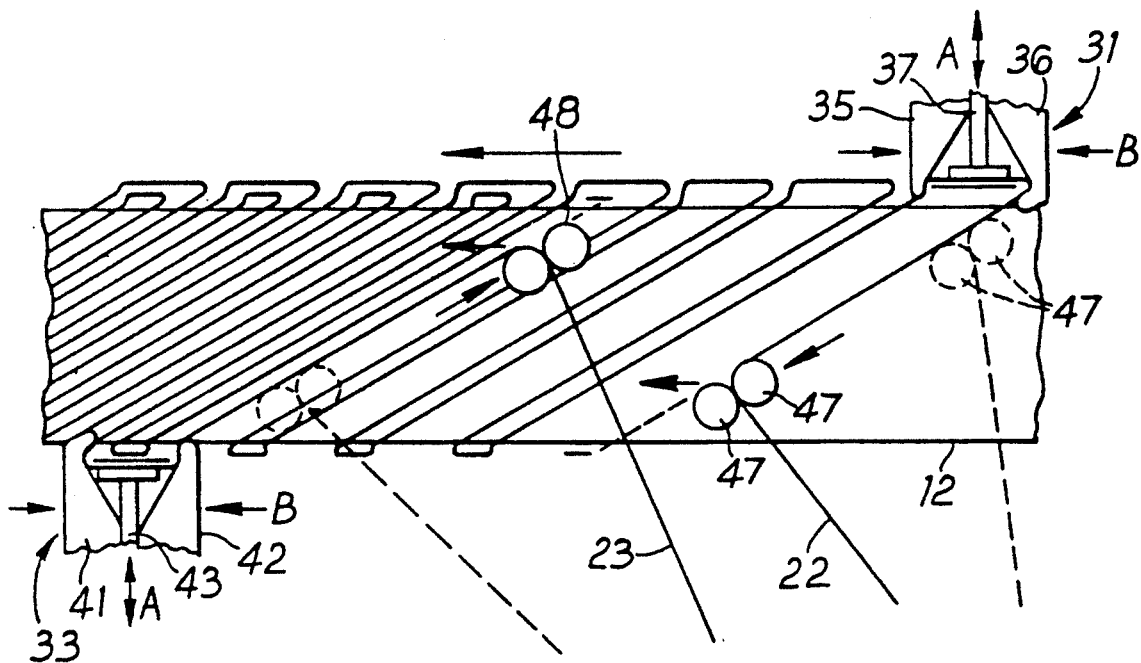
Figure 9:
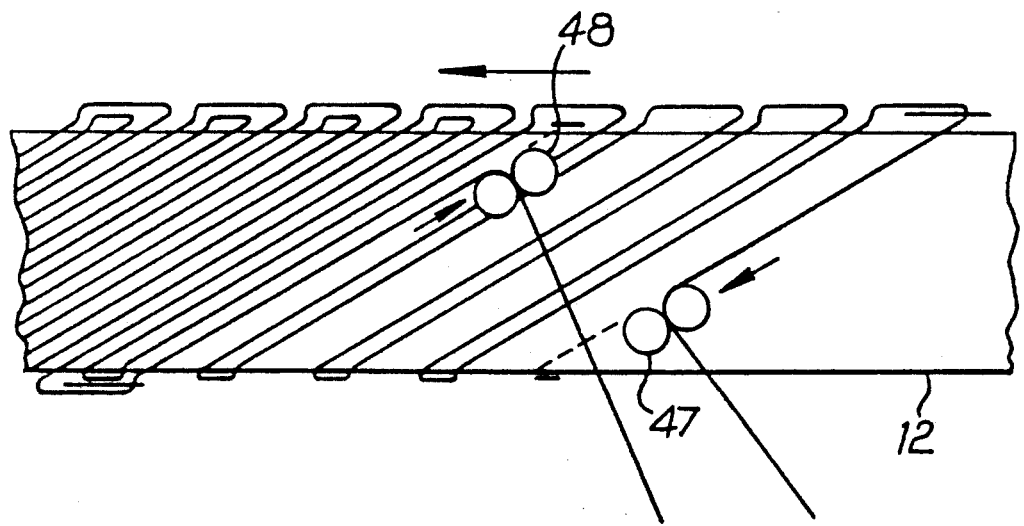

Mounted adjacent to each outer edge of the belts and adjustable with them are a pair of blades 18, 19, 20, 21 (see FIG. 7). These are used for holding the wire cords during the wire laying operation whilst the outer edge regions 6 and 8 are formed. Blades 18, 20 are used for forming edge regions 6 and blades 19, 21 utilised for forming edge regions 8. All blades are arranged to rise and fall in sequence during the cord laying operation.

In the cord laying operation two wire cords 22 and 23 are drawn out respectively from standard reels 24 and 25 (see FIG. 5). The reels are mounted on braked shaft means so as to impart a known tension which can be varied to suit the operation and the whole is mounted in a temperature controlled environment.

The cords 1, 2 are fed to two laying head carriages 26, 27 mounted respectively on slideways 28, 29 in such a manner that the carriages are able to travel obliquely across the upper face of the lower rubber film 12 at the specified bias angle. Also mounted on each laying head carriage 26, 27 is a respective pair of laying rollers 47, 48 which guide a respective cord along an oblique path which extends at the above referred to angle A of 21 degrees. A swing-over pressure roller (not shown) may be mounted on each carriage to embed the wires into the rubber film 12.

The slideways 28, 29 are capable of rotating about a machine centre line to permit change of the bias angle when required. The carriages 26, 27 are made to traverse along their slideways 28, 29 by a drive unit 30 which is mechanically linked to the conveyor indexing drive. Both carriages are mechanically linked together, for example by two racks and a common pinion (not shown) such that they travel across the conveyor simultaneously but in opposite directions.

Wire forming assemblies 31, 32, 33 and 34 (see FIG. 5) are mounted adjacent to the blade assemblies 18, 19, 20 and 21 (see FIG. 7). They contain wire deforming means which is capable of moving towards or away from the blades on centre lines at right angles to the centre line of the apparatus, i.e. in the directions of the arrows A of FIGS. 6 and 8. Mounted in the forming assembly 31 (see FIG. 8) are a pair of jaws 35 and 36 and a plunger 37. Similarly in the forming means 32, 33 and 34 are mounted jaws 38, 39, 41, 42, 44 and 45, respectively, and plungers 40, 43 and 46, respectively (see FIGS. 6 and 8). The jaws of each assembly are operable to move toward or away from one another in the directions of the arrows B of FIGS. 6 and 8, being the longitudinal direction of movement of the fabric reinforcement through the apparatus. The jaws and plungers may be operated by pneumatic or hydraulic means to coincide with the wire laying sequence and to impart a permanent set in the cords.

Also mounted in the forming assembly 31 is a vertically operated clamp (not shown) which clamps a wire cord to the lower rubber film 12 and conveyor when the blade 18 is retracted. The clamp also holds the wire firmly in place during the indexing movement of the belts and until the cord on the opposite side of the breaker material has been formed around blade 21, whereupon it releases the cord and is reset to its original position above blade 18.

Similarly mounted in forming assemblies 32, 33 and 34 are vertically operated clamps for holding the cords at blades 19, 20 and 21, respectively.

Figure 6:
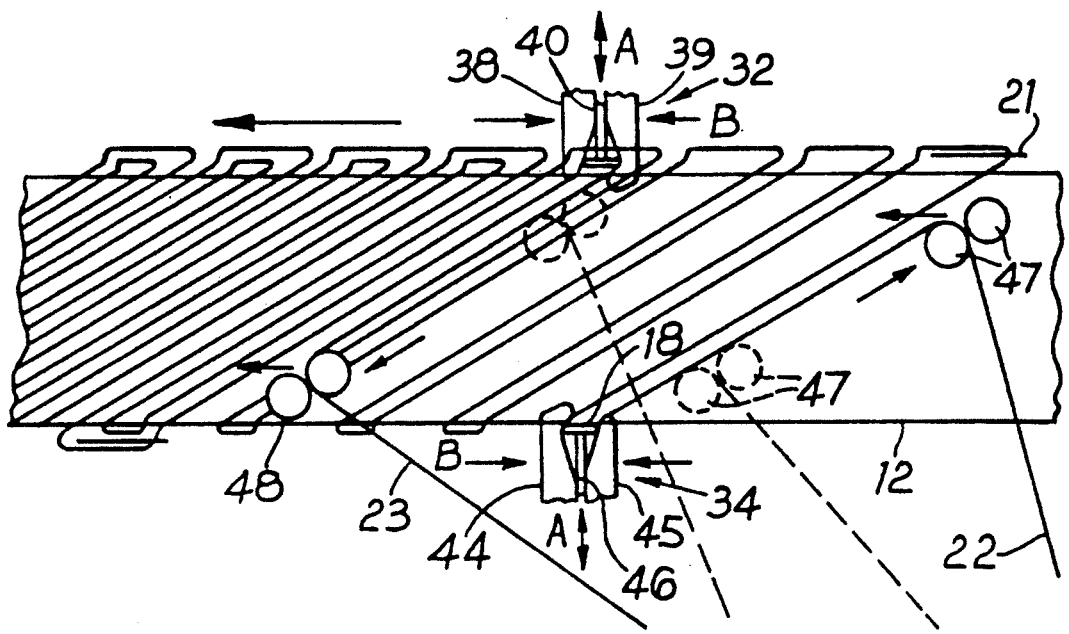

The cord wind laying sequence of the apparatus operates as follows:

Referring to FIGS. 6, 7, 8 and 9 and considering the operation of laying one cord only, (the second cord being laid simultaneously and the apparatus performing in a similar but complimentary manner about the centre line C—C), the sequence is:

Starting from the position shown in FIG. 6, cord 22 is drawn out from a reel and fed through the two guide rollers 47 when in the position shown in dotted lines. Wire forming assembly 34 operates to shape the wire cord 22 around blade 21, jaws 44 and 45 open and the assembly moves away from the edge of the conveyor leaving the cord secured on the blade. When the carriage 26 almost reaches the position where the rollers 47 are shown in full in FIG. 6 the blade 21 lowers and simultaneously the wire clamp (not shown) operates to secure the wire cord 22 onto the rubber film 12. The carriage laying rollers clamp and the conveyor indexes forward three pitches of wire which lines up the carriage in readiness for winding the cord around blade 18, shown in FIG. 7. The carriage moves past the blade position and the blade 18 is then raised at the same time that the laying rollers retract three pitches, thus hooking the wire onto the blade. The carriage changes direction and starts its next run. At the position of the laying rollers 47 shown in dotted lines in FIG. 8 the wire forming assembly 31 operates around blade 18. Jaws 35 and 36 open and the assembly moves away from the edge of the conveyor, leaving the cord secured to the blade 18.

The carriage 26 continues on its path toward blade 21 and just prior to reaching the position shown in full lines blade 18 lowers and simultaneously the wire clamp operates to secure the wire to the rubber film 12. The carriage laying rollers clamp and the conveyor indexes forward one pitch of the wire. This lines up the laying rollers 47 in readiness for winding the cord around blade 21. The carriage 26 continues its path past blade 21 which then rises and the laying rollers move back one pitch, thus hooking the cord around the blade 18 shown in FIG. 6. The sequence is then repeated as above for both of the cords 1, 2 to construct the desired length of fabric reinforcement.

Having been laid and rolled into the lower rubber film the breaker cords are progressed to the end of the belts 16 where the upper rubber film 13 is laid onto the cords. The resulting fabric material then passes under a consolidator 49 which impregnates the two rubber films into interstices between the cords thereby to produce a homogeneous sheet of breaker fabric. The lining material 14 is removed from both sides of the breaker material by means 15 described above. The breaker fabric progresses to an edge folding unit 50, which folds the edges of the top rubber film 13 around the bare wire edges and underneath, to meet the edges of the lower film 12.

The film is then passed through a cutting means 51 which cuts through a measured length of breaker material, following the line of the oblique cords. The cut length is accelerated away from the cutter by rollers 52 and positioned above an awaiting carrier means 53 onto which the breaker may be automatically positioned by utilising an overhead electromagnet 54 to hold the breaker whilst the rollers 52 are withdrawn. The carriage may then transport the cut length of fabric to, for example, a tyre building machine in which it is used to form a breaker component.

We claim:

1. A flexible reinforced polymeric article comprising at least one layer (12) of flexible polymeric material and at least two flexible reinforcement elements (1,2) secured to said polymeric material, characterised in that one flexible element (1) extends successively to and fro across the polymeric material from a first edge region (5) toward a second edge region (5') and back to the first edge region (5) and a second flexible element (2) extends successively to and fro across the polymeric material from the second edge region (5') toward the first edge region (5) and back to the second edge region (5'), successive portions (4) of said second flexible element (2) being arranged to lie in spaces between successive portions (3) of the first flexible element (1) extending to and from said first edge region (5) whereby successive portions of each element lie interdigitated with successive portion of the other element in a manner free of cross-over of the elements.

2. An article as claimed in claim 1, characterised in that the two reinforcement elements (1,2) have a zig-zag lay.

3. An article as claimed in claim 1, characterised in that each flexible reinforcement element extends across an elongate layer of flexible polymeric material at right angles relative to the length (C—C) of the layer.

4. An article as claimed in claim 1, characterised in that each flexible reinforcement element (1,2) extends across an elongate layer (12) of flexible polymeric material at an oblique angle in the range 18 to 90 degrees relative to the length (C—C) of the layer.

5. An article as claimed in claim 1, wherein all portions (3,4) of the reinforcement elements (1,2) are substantially parallel with one another in a central region between said edge regions (5,5').

6. An article as claimed in claim 1, wherein each element (1,2) has at least one intermediate portion (6,8) which interconnects portions of the element in a central region between said edge regions (5,5').

7. An article as claimed in claim 6, characterised in that said intermediate portion (6,8) extends in a direction substantially parallel with the direction of the length (C—C) of the layer (12).

8. An article as claimed in claim 7, characterised in that said intermediate portion (6,8) is of a length greater than the spacing of the interconnected central region portions (3,4) of the element (1,2) as considered in said direction of the length (C—C) of the layer (12).

9. An article as claimed in claim 1, wherein successive intermediate portions (6,8) of said flexible element at a first or second respective edge region (5,5') and also intermediate portions of said element remote from either edge region extend parallel with the direction (C—C) of the layer.

10. An article as claimed in claim 1, wherein only one (6) of the series of successive intermediate portions (6,8) of the flexible elements (1,2) at one of said edge regions (5,5') or remote from said one of said edge regions extends substantially parallel with the direction of the length (C—C) of the layer.

11. An article as claimed in claim 10, characterised in that the series of successive intermediate portions (6) at a respective edge region extends substantially parallel with the direction (C—C) of the length of the layer.

12. An article as claimed in claim 1, further comprising two of said layers (12) of flexible polymeric material arranged in superimposed relationship with said flexible reinforcement elements (1,2) therebetween.

13. An article as claimed in claim 12, characterised in that the elements (1,2) are sandwiched between two layers (12) one of which is wider than the other, edge portions of the wider layer lying folded around the edges of the layer of reinforcement elements and in contact with edges of the narrower layer.

14. An article as claimed in claim 1, wherein the reinforcement flexible elements (1,2) are laid with the successive portions (3,4) at a constant pitch in a central region of the article.

15. An article as claimed in claim 1, wherein the flexible reinforcement elements (1,2) comprise cords.

* * * * *